(12) United States Patent
Schneider

(10) Patent No.: US 12,485,370 B2
(45) Date of Patent: Dec. 2, 2025

(54) FILTER DEVICE FOR A DISHWASHER OR WASHING MACHINE

(71) Applicant: Hans-Joachim Schneider GmbH, Blankenfelde-Mahlow (DE)

(72) Inventor: Olaf Schneider, Blankenfelde-Mahlow (DE)

(73) Assignee: Hans-Jaochim Schneider GmbH, Blankenfelde-Mahlow (DE)

( * ) Notice: Subject to any disclaimer, the term of this patent is extended or adjusted under 35 U.S.C. 154(b) by 289 days.

(21) Appl. No.: 18/026,194

(22) PCT Filed: Dec. 6, 2021

(86) PCT No.: PCT/DE2021/000190
§ 371 (c)(1),
(2) Date: Mar. 14, 2023

(87) PCT Pub. No.: WO2022/127957
PCT Pub. Date: Jun. 23, 2022

(65) Prior Publication Data
US 2023/0364532 A1    Nov. 16, 2023

(30) Foreign Application Priority Data

Dec. 14, 2020  (DE) ...................... 20 2020 107 231.5

(51) Int. Cl.
*B01D 29/03* (2006.01)
*A47L 15/42* (2006.01)
*B01D 35/30* (2006.01)
*D06F 39/10* (2006.01)

(52) U.S. Cl.
CPC .......... *B01D 29/03* (2013.01); *A47L 15/4204* (2013.01); *B01D 35/30* (2013.01); *D06F 39/10* (2013.01)

(58) Field of Classification Search
CPC ..... B01D 29/03; B01D 35/30; A47L 15/4204; A47L 15/4202; D06F 39/10
USPC ............. 210/443, 455, 171, 380.2, 435, 439
See application file for complete search history.

(56) References Cited

U.S. PATENT DOCUMENTS

| 3,240,345 A | 3/1966 | Butler et al. |
| 2007/0137265 A1 | 6/2007 | Shikamori et al. |

FOREIGN PATENT DOCUMENTS

| EP | 1751343 A1 | 2/2007 |
| GB | 2581790 A | 9/2020 |
| JP | 2010057651 A | * 3/2010 |

OTHER PUBLICATIONS

English Machine Translation of JP2010057651A (Year: 2010).*

* cited by examiner

*Primary Examiner* — Madeline Gonzalez
(74) *Attorney, Agent, or Firm* — Smartpat PLC

(57) ABSTRACT

A filter device for dishwashers or washing machines comprises a filter housing, an inlet opening for raw water, and an outlet opening for clean water. The inlet opening is formed in a first housing wall. A filter for filtering the raw water is arranged downstream from the inlet opening in the flow path of the raw water. The outlet opening is formed in the first housing wall.

12 Claims, 3 Drawing Sheets

FILTER DEVICE FOR A DISHWASHER OR WASHING MACHINE

CROSS-REFERENCE TO RELATED APPLICATION

This application is a national stage application, filed under 35 U.S.C. § 371, of International Patent Application No. PCT/DE2021/000190, filed on 6 Dec. 2021, which claims the benefit of German Patent Application No. 20 2020 107 231.5, filed 14 Dec. 2020.

TECHNICAL FIELD

The present disclosure relates to a filter device for a dishwasher or washing machine.

BACKGROUND

Lint filter cases or filter boxes for a dishwasher or washing machine are generally known.

A filter case, filter housing, or also a filter box is in each case a component, which is inserted into a device, which cleans by means of water, e.g. a washing machine, in order to free the raw water from coarse residues, for example foreign objects of all types, such as lint, sand, buttons, coins, etc., after a washing process. Such filter devices are connected to the water discharge side of industrial washing machines, dishwashers, or other appliances with water drainage into the public sewage system, in order to coarsely clean the waste water prior to the introduction into the waste water system.

The conventional filter devices of the prior art have an inlet opening, through which raw water from the dishwashing or washing process is introduced into a filter housing, and an outlet opening, through which raw water filtered in the filter housing is guided out of the filter device as clean water. A filter, through which the raw water flows from the direction of the inlet opening, in order to be freed from the above-mentioned coarse residues, is arranged between the inlet opening and the outlet opening in the flow path of the water. The outlet opening is located on an opposite side of the filter housing, so that the flow path through the filter housing essentially takes place from one side to the other side of the filter housing. The inlet opening and the outlet opening each have an inlet nozzle and an outlet nozzle, to which a pipe can in each case be connected in order to ensure the water supply to the inlet opening or the removal of the water from the outlet opening, respectively. This construction has the disadvantage that when setting up a, for example, industrial washing machine, pipe connections have to be provided or also processed, respectively, on two different sides. Connection points for the inlet and the outlet of the water, which are located diametrically opposite, also have to be considered during the maintenance, which is generally laborious and which can often be problematic in confined spaces.

SUMMARY

It is an object of the present disclosure to further develop a filter device for a dishwasher or washing machine in such a way that a setup and maintenance of dishwashers or washing machines is significantly simplified compared to filter devices of the prior art.

The filter device for a dishwasher or washing machine comprises a filter housing, an inlet opening for raw water, and an outlet opening for clean water. The inlet opening is formed in a first housing wall. A filter for filtering the raw water is arranged downstream from the inlet opening in the flow path of the raw water. The outlet opening is formed in the first housing wall.

With the formation of the inlet opening and the outlet opening in the same first housing wall, the entire piping can take place from one side of the dishwasher or washing machine. The setup and maintenance of the corresponding dishwasher or washing machine is thus significantly simplified even in confined spaces.

A further advantage is that in an operating position of the filter housing, the outlet opening is arranged at a distance below the inlet opening. The arrangement of the outlet opening below the inlet opening leads to a flow gradient, which has a positive impact for the flow path.

A further advantage is that the filter forms a flow channel with a second housing wall over at least one section of the flow path. It is made possible with this measure to use the filter and the filter housing as flow channel without additional components.

A further advantage is that the flow channel is arranged below the filter. Due to the arrangement of the inlet opening above the outlet opening, it is useful when the second housing wall is the bottom of the filter housing, and the filter is arranged at a distance from the bottom of the filter housing. The back flow of the cleaned raw water or of the clean water, respectively, can thus take place below the filter in the direction of the outlet opening.

A further advantage is that the filter comprises a screen element, which extends transversely over the flow path of the raw water. The screen element thus represents an obstacle for the coarse residues in the raw water, but not for the water per se. The filtering of the raw water is thus made possible as a function of the screen width. The screen element is generally located at an angle of 45° or 90° to the water flow. All of the filter sludge has to be "scraped" off the bottom of the filter case and forms a sump on the bottom, in particular in the case of irregular cleaning. This can lead to the clogging of the pump, in particular when using a sump pump. The exclusive accumulation of residues on the bottom of filter cases also makes the cleaning thereof more difficult.

Due to the fact that the filter is attached at a higher point, it has a bottom, which can be formed as catch pan and which better catches the residues, so that they cannot even deposit on the bottom and form a sump. It is thereby also helpful for an easy cleaning that the filter can be removed on a handle.

The screen element is arranged in an obtuse flow angle to the flow path of the raw water. The obtuse flow angle has the result that a flat distribution of the raw water over a larger region of the screen element takes place in response to the inflowing impact, so that the water can pass through this larger region of the screen element and finds a way, even if coarse residues are retained on the screen surface.

A further advantage is that a deflection region, in which a flow direction of the clean water is deflected to the flow channel, is formed in the filter housing between the filter and an inlet of the flow channel. The clean water, which flows from the screen element into the deflection region, is thus not removed from the filter housing on the rear side thereof, but bounces back from the rear wall, so that the flow direction "deflects" by approximately 180°. The clean water, which flows back, is then guided through the flow channel under the filter to the outlet opening.

Further advantages of the present invention follow from the further features of the subclaims.

An embodiment of the present invention will be described in more detail below on the basis of the drawings.

DETAILED DESCRIPTION

Figure 1:
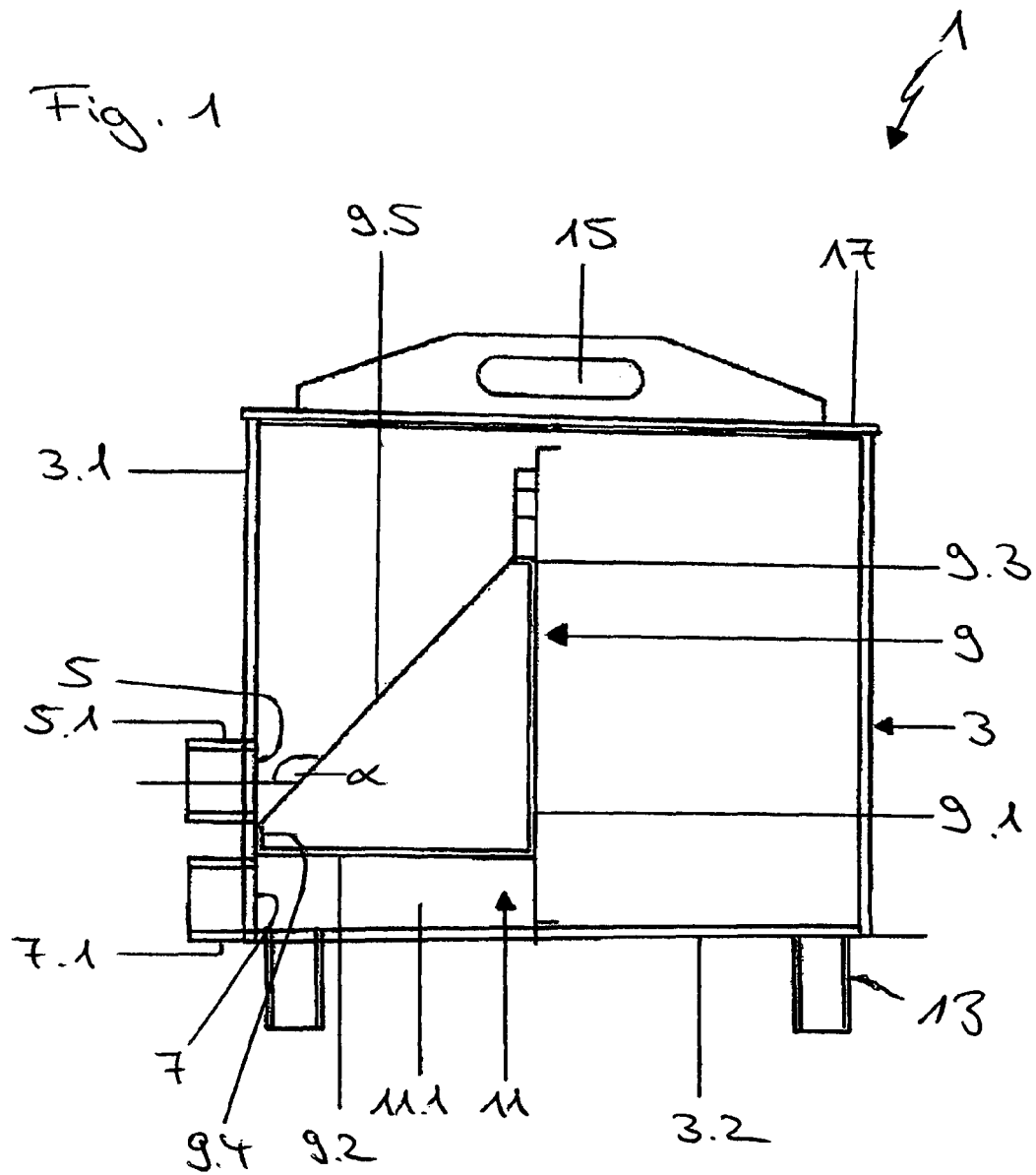
FIG. 1 shows a schematic sectional illustration in the longitudinal section through a filter housing of a filter device.

A filter device 1 is illustrated schematically in FIG. 1. The filter device 1 comprises a filter housing 3, which is formed as rectangular case in the present embodiment. In other embodiments, the filter housing 3 can also have other shapes.

The filter housing 3 has several housing walls, which enclose the filter housing 3 on all sides. A first housing wall 3.1 and a second housing wall 3.2 is significant for the present invention. An inlet opening 5, to which the inlet nozzle 5.1 is attached on the outside, is formed in the first housing wall 3.1. An outlet opening 7 is formed in the first housing wall 3.1 at a distance from the inlet opening 5. The outlet opening 7 also has an outlet nozzle 7.1 on the outer side of the first housing wall 3.1. The inlet nozzle 5.1 and the outlet nozzle 7.1 also lie at a distance from one another.

A filter 9 is arranged in the filter housing 3. With a first carrier element 9.1, the filter 9 extends parallel to the first housing wall 3.1, and with a second carrier element 9.2 parallel to a second housing wall 3.2. The second carrier element 9.2 extends from the first carrier element 9.1 all the way to the first housing wall 3.1. A screen element 9.5 extends from a free end of the first carrier element 9.1, that is, from an end 9.3 of the first carrier element 9.1 distally from the second housing wall 3.2, and an end 9.4 of the second carrier element 9.2 adjoining the first housing wall 3.1. The screen element 9.5 extends in such a way that in an operating position of the filter housing 3, the inlet opening 5 lies completely above the screen element 9.5.

In the embodiment illustrated in FIG. 1, the raw water from the inlet opening 5 hits the screen element 9.5 at an obtuse flow angle α. Coarse residues in the raw water are retained by the screen element 9.5, while the water per se can flow through the screen element 9.5. A flow path between the screen element 9.5 and the outlet opening 7 is guided through a flow channel 11.1 at least in a last section 11 upstream of the outlet opening 7. The flow channel 11.1 leads into the outlet opening 7 from the inside.

The UNI filter box can be continuously height-adjusted by means of the plastic pipe nozzles 13, which are attached under the second housing wall 3.2 (the bottom), by sawing them off or by attaching longer plastic pipes.

Figure 2:
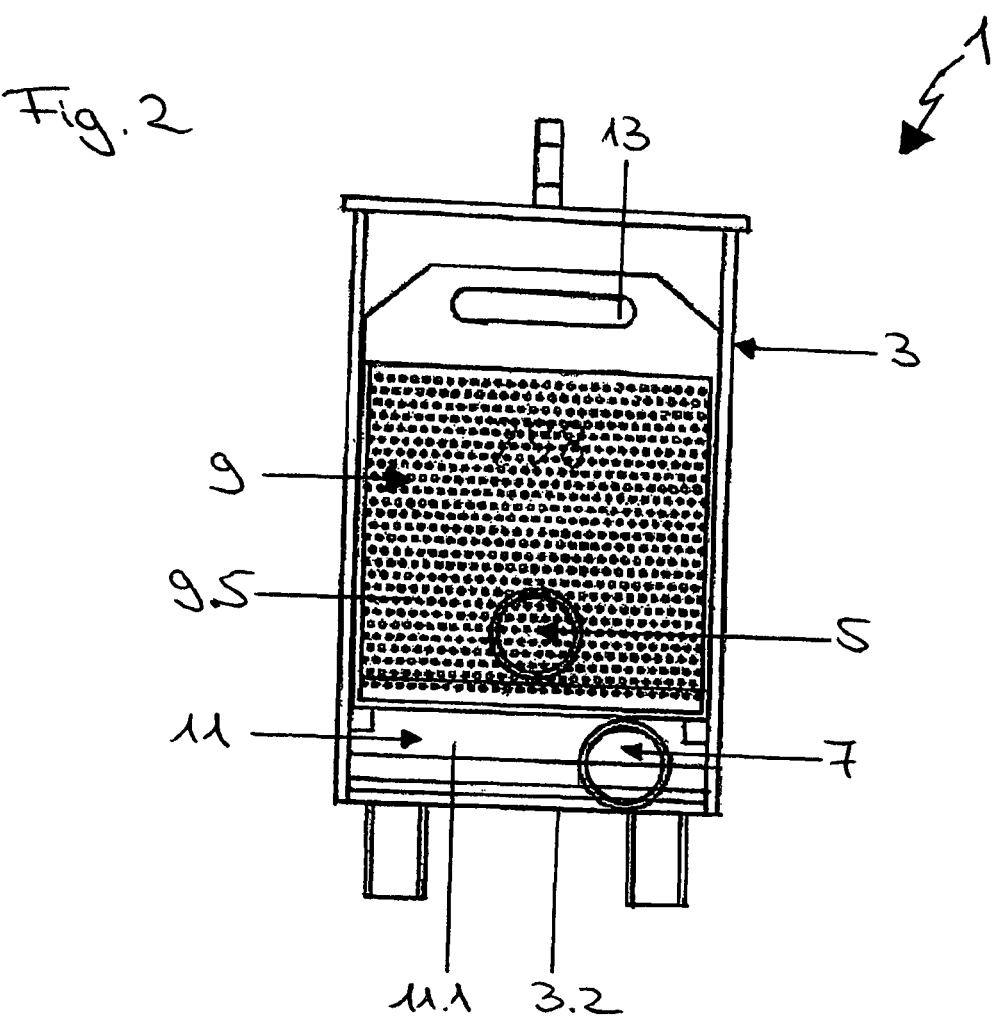
FIG. 2 shows a schematic sectional illustration in the cross section through the filter housing from FIG. 1.

It is illustrated schematically in FIG. 2 in the cross section through the filter housing 3, how the screen element 9.5 extends in the filter housing 3. The filter 9 has a handle 15, by means of which the filter 9 can be removed from the filter housing 3. The filter housing 3 likewise has a handle 15 (FIG. 1), by means of which a cover 17 of the filter housing 3 can be taken off. It can be seen in FIG. 2 that the outlet opening 7 is not only formed below the inlet opening 5, but additionally also horizontally offset to the inlet opening 5.

Figure 3:
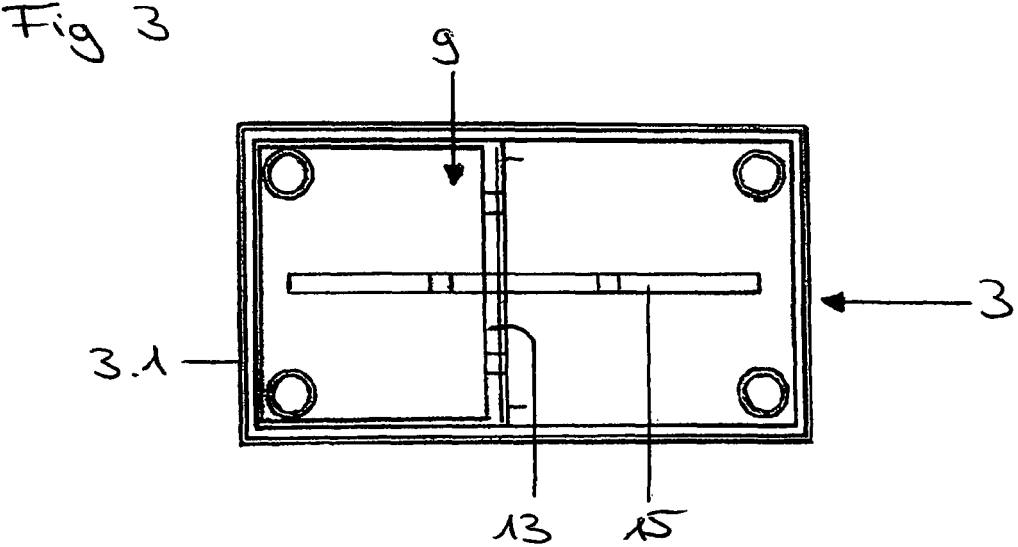
FIG. 3 shows a schematic sectional illustration in a horizontal section through the filter housing from FIG. 1.

A top view in the horizontal section of the filter housing 3 is illustrated schematically in FIG. 3. In its geometry, the filter 9 is adapted to the geometry of the inner dimensions of the filter housing 3 in such a way that the filter 9 can be inserted releasably, yet firmly into the filter housing 3.

Figure 4:
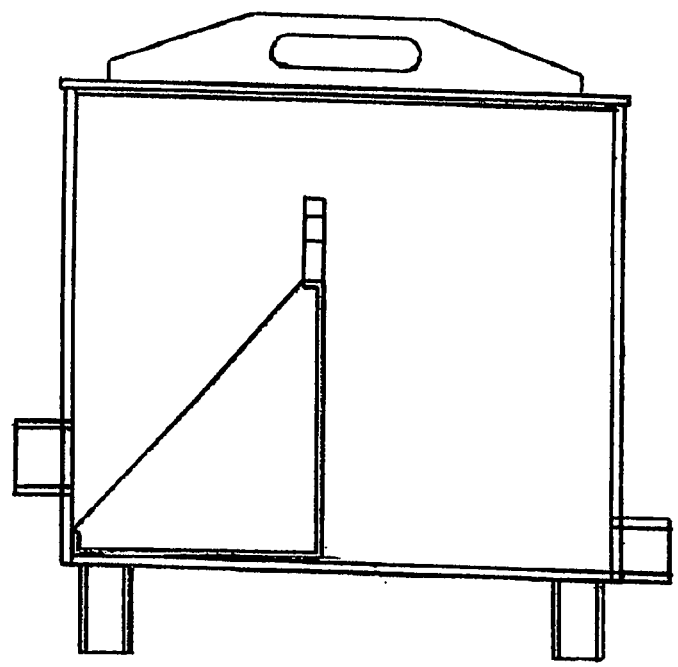
FIG. 4 shows a schematic sectional illustration in the longitudinal section of a filter housing of the prior art.
Figure 5:
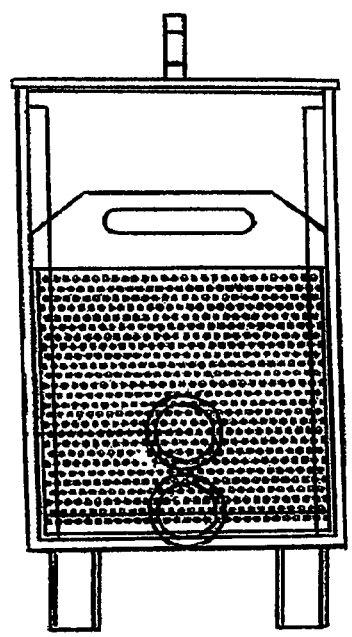
FIG. 5 shows a sectional illustration in the cross section of the filter housing from FIG. 4.

A filter housing 3 of the prior art is illustrated in FIG. 4 and FIG. 5. It can be seen that, on the one hand, the inlet opening 5 and the outlet opening 7 are located diametrically opposite one another, are thus formed in two housing walls located opposite one another, and, on the other hand, are arranged in the same vertical plane, thus not laterally offset from one another.

LIST OF REFERENCE NUMERALS 1 filter device
3 filter housing
3.1 first housing wall
3.2 second housing wall
5 inlet opening
7 outlet opening
9 filter
9.1 first carrier element
9.2 second carrier element
9.3 distal end
9.4 adjoining end
9.5 screen element
11 last section
11.1 flow path
13 pipe nozzle
15 handle
17 cover

The invention claimed is:

1. A filter device for dishwashers or washing machines, comprising:
    a filter housing (3);
    an inlet opening (5) for raw water formed in a first housing wall (3.1);
    a filter (9) for filtering the raw water, the filter (9) being arranged downstream from the inlet opening (5) in a flow path of the raw water; and
    an outlet opening (7) for clean water formed in the first housing wall (3.1), wherein the filter (9) comprises
        a first carrier element (9.1) extending vertically and parallel to the first housing wall (3.1) within the filter housing (3),
        a second carrier element (9.2) extending horizontally from a lower end of the first carrier element (9.1) to the first housing wall (3.1), and a screen element (9.5), which extends transversely over the flow path of the raw water, and
    wherein the filter (9) forms a flow channel (11.1) with a second housing wall (3.2) over a section (11) of the flow path.

2. The filter device according to claim 1,
    wherein, in an operating position of the filter housing (3), the outlet opening (7) is arranged at a distance below the inlet opening (5), and
    wherein the second carrier element (9.2) is located vertically between the inlet opening (5) and the outlet opening (7).

3. The filter device according to claim 1,
    wherein the filter (9) forms a flow channel (11.1) with a second housing wall (3.2) over at least one section (11) of the flow path, wherein the flow channel (11.1) extends between the second housing wall (3.2), which is a bottom wall of the filter housing (3), and the second carrier element (9.2) aligned with the outlet opening (7).

4. The filter device according to claim 3,
wherein the flow channel (11.1) extends horizontally from the first housing wall (3.1) to the first carrier element (9.1).

5. The filter device according to claim 3,
wherein the flow channel (11.1) leads downstream into the outlet opening (7).

6. The filter device according to claim 1,
wherein the screen element (9.5) extends between an upper end of the first carrier element (9.1) and an end of the second carrier element (9.2).

7. The filter device according to claim 6,
wherein the screen element (9.5) is arranged obliquely in the filter (9).

8. The filter device according to claim 6,
wherein the screen element (9.5) is arranged at an essentially obtuse flow angle ($\alpha$) of the raw water.

9. The filter device according to claim 1,
wherein the inlet opening (5) has an inlet nozzle (5.1) on the first housing wall (3.1), and
wherein the outlet opening (7) has an outlet nozzle (7.1) on the first housing wall (3.1).

10. The filter device according to claim 9,
wherein the inlet nozzle (5.1) and the outlet nozzle (7.1) are aligned essentially in parallel.

11. The filter device according to claim 1,
wherein a deflection region is formed between the screen element and the flow channel, such that the flow of the clean water is redirected by approximately 180° before entering the flow channel.

12. The filter device according to claim 1,
wherein the screen element (9.5) is located entirely above the outlet opening (7).

* * * * *

UNITED STATES PATENT AND TRADEMARK OFFICE
CERTIFICATE OF CORRECTION

| | | |
|---|---|---|
| PATENT NO. | : 12,485,370 B2 | Page 1 of 1 |
| APPLICATION NO. | : 18/026194 | |
| DATED | : December 2, 2025 | |
| INVENTOR(S) | : Olaf Schneider | |

It is certified that error appears in the above-identified patent and that said Letters Patent is hereby corrected as shown below:

On the Title Page

Item [73], "Hans-Jaochim Schneider GmbH" should read --Hans-Joachim Schneider GmbH--

Signed and Sealed this
Thirtieth Day of December, 2025

John A. Squires
*Director of the United States Patent and Trademark Office*